US006800197B1

(12) United States Patent
Kosola et al.

(10) Patent No.: US 6,800,197 B1
(45) Date of Patent: Oct. 5, 2004

(54) CONTINUOUSLY OPERABLE ROTATING DRUM PRESSURE DIFFERENTIAL FILTER, METHOD AND SYSTEMS

(75) Inventors: Antti Kosola, Kirkkonummi (FI); Ryszard Braun, Rochester, NY (US); Stefan Ekbom, Tenala (FI)

(73) Assignee: Genencor International, Inc., Palo Alto, CA (US)

( * ) Notice: Subject to any disclaimer, the term of this patent is extended or adjusted under 35 U.S.C. 154(b) by 214 days.

(21) Appl. No.: 09/689,279

(22) Filed: Oct. 12, 2000

(51) Int. Cl.[7] ............................................. B01D 37/02
(52) U.S. Cl. ..................... 210/193; 210/258; 210/324; 210/396; 210/402; 210/406; 210/777; 210/784; 210/791
(58) Field of Search ................................. 210/193, 255, 210/258, 262, 324, 396, 402, 405–409, 632, 777, 784, 791

(56) References Cited

U.S. PATENT DOCUMENTS

| | | | |
|---|---|---|---|
| 4,442,001 A | | 4/1984 | Davis .......................... 210/402 |
| 5,149,448 A | * | 9/1992 | Mattelmaki .................. 210/784 |
| 5,407,587 A | | 4/1995 | Westerberg .................. 210/784 |
| 5,470,472 A | * | 11/1995 | Baird .......................... 210/396 |
| 5,759,397 A | * | 6/1998 | Larsson et al. .............. 210/331 |
| 5,968,372 A | * | 10/1999 | Martensson et al. ........ 210/784 |

FOREIGN PATENT DOCUMENTS

| | | |
|---|---|---|
| FR | 854 544 A | 4/1940 |
| FR | 1 165 054 A | 10/1958 |
| GB | 1057015 | 2/1967 |
| WO | WO 82/00029 | 1/1982 |

OTHER PUBLICATIONS

Copy of Search Report.

* cited by examiner

*Primary Examiner*—Robert James Popovics
(74) *Attorney, Agent, or Firm*—Kilyk & Bowersox, P.L.L.C.

(57) ABSTRACT

A rotating drum pressure differential filter is provided whereby a layer of filter medium is continuously refreshed by a spray applicator device after the layer is utilized to filter components sample medium and a portion of the layer is subsequently scraped to remove sample medium waste from the layer. Methods of filtration using the device are also provided as are systems employing two or more such filters. A spray applicator device useful for refreshing a filter medium on the outer surface of a rotating drum pressure differential filter is also provided as is a retro fit kit useful in modifying existing rotating drum pressure differential filters to enable the continuous formation of a refreshed filter medium layer. The continuously refreshed filter and filter systems provide a minimized down time of the filter and system operations. Multiple-stage filtration processes are also provided and are particularly in the recovery of enzymes from fermentation broths.

17 Claims, 8 Drawing Sheets

CONTINUOUSLY OPERABLE ROTATING DRUM PRESSURE DIFFERENTIAL FILTER, METHOD AND SYSTEMS

BACKGROUND OF THE INVENTION

The present invention relates to a rotating drum vacuum filter and a method of filtering material using such a filter. More particularly, the present invention relates to a rotating drum vacuum filter for recovering enzymes from a fermentation broth. The present invention also relates to filtration systems and methods of filtering using such systems.

Rotating drum vacuum filters have been used to separate components from a sample medium. Typically, the rotating drum vacuum filter is rotated such that a portion of the drum passes through a container containing a sample medium. Filtrate filtered through the drum is carried away or collected from an interior of the drum. Other components from the sample medium, for example, larger components that do not pass through the drum, typically remain on a layer of filter medium that has been applied to the outer surface of the drum. As the drum rotates through then out of a sample medium to be filtered, a thin layer of the filter medium along with sample medium that did not pass through the drum is scraped off of the outer surface of the drum with a scraping blade, forming a thinner layer of filter medium. The thinner layer of filter medium on the outer surface then passes through the sample medium to filter more filtrate through the drum. With each revolution of the drum, the scraping blade is moved closer to the drum and the layer of filter medium becomes thinner and thinner. Frequently, the drum must be stopped, the sample medium must be removed, and a new full-thickness layer of filter medium must be applied to the outer surface of the drum.

A need exists for a rotating drum vacuum filter that does not require frequently shutting down the filtering operation to rebuild the layer of filter medium on the outer surface of the drum.

In enzyme recovery processes using rotary drum vacuum filters, process speed has typically been run slowly so as to maximize the amount of enzyme recovered from a fermentation broth. High speed processing results in incomplete recovery and filter medium and sample medium scraped from the drum typically includes a large amount of wasted enzyme. A need further exists for an enzyme recovery process that uses a rotating drum vacuum filter that can run at high speed and efficiently recover more complete amounts of enzyme from a fermentation broth.

SUMMARY OF THE PRESENT INVENTION

The present invention provides a rotating drum pressure differential filter that includes a device for continuously refreshing a layer of filter medium on the outer surface of the drum such that there is no need to shut down the filtering operation to refresh or rebuild the filter medium. The present invention also provides a filtration system that employs at least one rotating drum pressure differential filter according to the present invention and at least one other rotating drum filter. The present invention also provides a method of enzyme recovery wherein a high percentage of recoverable enzyme is recovered from a fermentation broth during a high speed multi-stage process. In addition, the present invention relates to a filter medium application kit adapted to be retrofitted to existing rotating drum vacuum filters.

A rotating drum pressure differential filter according to an embodiment of the present invention includes a drum, a drive to rotate the drum, a source of differential pressure, a container for containing a sample medium, a scraper adapted to be positioned adjacent the drum, and an applicator adapted to be positioned adjacent to the drum for directing a layer of filter medium toward the outer surface of the drum and applying, rebuilding, or refreshing a filter cake on the drum. In a preferred embodiment of the present invention, the drum is rotatable about an axis of rotation. The drum includes at least one sidewall having an inner surface that at least partially defines an inner chamber, and an outer surface to which a layer of filter medium can be applied for forming a filter cake. The sidewall of the drum includes at least one opening for allowing the passage of fluid, such as a filtrate, from outside the drum to the inner chamber. The drive is designed to rotate the drum about the axis of rotation. The source of differential pressure provides a lower pressure in the inner chamber than outside the drum in the vicinity of the drum, for example, outside the drum in the environment immediately adjacent the at least one opening. The container is preferably positioned with respect to the drum such that, in operation, the drum is rotated about the axis of rotation and at least a portion of a layer of filter medium applied to the outside surface of the drum, also referred to as a filter cake, rotates within the container to contact sample medium disposed within the container. In a preferred embodiment of the present invention, the sample medium is an enzyme fermentation broth. The scraper is adapted to scrape a layer of filter medium from the drum as it rotates and the scraper can be provided with means to slightly advance the scraper towards the drum as the drum rotates. In a preferred embodiment, the applicator is a spray nozzle that applies a mixture, preferably a slurry, of diatomaceous earth mixed or suspended in a liquid such as water.

According to a preferred embodiment of the present invention, the rotating drum pressure differential filter includes a means, such as a control unit, to simultaneously operate the scraper and the applicator such that, in operation, the applicator directs a layer of filter medium toward the outer surface of the drum at the same time that the scraper scrapes a layer of filter medium from the drum.

According to embodiments of the present invention, a method of separating components from a sample medium is also provided and comprises rotating a rotating drum pressure differential filter of the present invention through a sample medium and causing a relatively lower pressure inside the drum that forces filtrate through a filter cake and through openings in the wall of the drum. The method further includes scraping at least a portion of the layer of filter medium from the outer surface of the drum after the portion contacts the sample medium, and applying filter medium to the outer surface of the drum after the scraping operation to rebuild or form a fresh layer of filter medium that is subsequently contacted with the sample medium. Preferably, the scraping and applying are performed simultaneously.

In another embodiment of the present invention, a system of two or more rotating drum pressure differential filters is provided wherein at least one of the filters is a filter according to the present invention. The system includes a conveying means or device to convey scraped filter medium and sample medium from at least one of the drums to at least one other rotating drum pressure differential filter whereby recoverable components that were not recovered by the first drum can subsequently be recovered through use of another drum. A two-stage recovery method using the system is also provided according to embodiments of the present invention.

According to yet further embodiments of the present invention, a method of reducing the downtime of a rotating drum pressure differential filter is provided whereby downtime is reduced by employing a rotating drum pressure differential filter according to the present invention and simultaneously applying a fresh layer of filter medium while scraping a used layer of filter medium. The simultaneous scraping and applying obviates downtime associated with traditional methods of filtration whereby no simultaneous rebuilding, refreshing, or reforming of a filter layer is provided and instead the filter needs to be frequently stopped so that a brand new filter cake can be formed.

In yet other embodiments of the present invention, a method of increasing the throughput of an enzyme fermentation recovery process is provided whereby filtered sample medium scraped from a first rotating drum pressure differential filter is conveyed to a second rotating drum pressure differential filter to further separate or recover enzyme from a previously filtered sample medium scraped from a first filter.

In yet another embodiment of the present invention, an applicator device is provided that is adapted to be positioned with respect to an existing rotating drum filter having a scraper. The device includes an applicator for applying a layer of filter medium to the outer surface of the rotating drum filter or to an existing layer of filter medium on the rotating drum filter. The applicator device further includes a positioning structure to position the applicator relative to the scraper such that in operation of the filter, the applicator is maintained at a constant distance from an outer surface of a layer of filter medium disposed on the outer surface of the drum. According to preferred embodiments of the present invention, the applicator includes a nozzle and may further include a pressurized gas conduit, and a pressurized filter medium conduit, whereby the nozzle combines pressurized gas from the gas conduit with pressurized filter medium from the filter medium conduit, to form a spray. Preferably, the pressurized filter medium conduit is disposed within the pressurized gas conduit and at least the filter medium is recirculated through its respective conduit.

It is to be understood that both the foregoing general description and the following detailed description are exemplary and explanatory only and are intended to provide further explanation of the present invention, as claimed.

BRIEF DESCRIPTION OF THE DRAWINGS

The invention may be more fully understood with reference to the accompanying figures. The figures are intended to illustrate exemplary embodiments of the present invention without limiting the scope of the invention.

DETAILED DESCRIPTION OF THE PRESENT INVENTION

The rotating drum pressure differential filter according to embodiments of the present invention includes a housing, preferably in the form of a hollow cylindrical drum, that is rotatable about an axis of rotation, preferably a central axis of rotation. The housing or drum includes at least one sidewall having an inner surface and an outer surface. The housing and drum may also include end plates that seal off the ends of the housing or drum. Preferably, the housing or drum is in the shape of a large cylinder and has circular end plates.

The drum sidewall includes at least one opening to permit the passage of fluid through the sidewall such that when a vacuum is applied to the inside of the housing or drum fluid such as air or a liquid sample medium can be drawn through the at least one opening. In a preferred embodiment, the sidewall of the housing or drum constitutes a porous, screen-like or mesh-like material having a large number of very small openings. The very small openings are large enough to permit the passage of a liquid sample medium through the openings yet are small enough to enable a filter cake of a very fine filter medium to be built up on the outer surface of the wall without pulling the filter medium through the opening. In this manner, the filter cake, such as a filter cake made up of diatomaceous earth, perlite, other minerals, or combinations thereof, can be built on the outer surface of the housing or drum. Although the openings may be large enough to permit passage of individual diatomaceous earth or filter medium particles through the openings, the openings are preferably small enough such that the filter medium particles can agglomerate or collect at or in the openings and prevent the further passage of filter medium particles through the openings.

A drive means such as a motor or other drive device is provided for rotating the housing or drum about its axis of rotation. Any suitable drive means can be used, including electric or fuel-powered motors. Drive chains, pulleys, or drive belt assemblies may be used to effectuate a transmission of driving power from the drive means to the rotatable housing or drum. Preferably, the drive means is coupled to a pulley or drive shaft at an end of the housing or drum. The housing or drum may be provided with an axle mounted on a suitable support bracket or device, and the drive can be coupled to the axle to transmit driving power to the axle.

The filter of the present invention may also include a source of differential pressure provided to cause a lower pressure in the inner chamber of the drum than outside the drum in the vicinity of the openings. The lower relative pressure in the inner chamber forces fluid, such as a liquid sample medium, to pass through the filter cake, through the openings, and into the inner chamber. In this manner, liquid, smaller components, and other filtrate materials can pass through the filter cake and openings and can be separated from larger components that cannot pass though the filter cake and openings. In a preferred embodiment of the present invention, a vacuum source is provided to form a vacuum in the inner chamber although other pressure differential means can be used. An alternative pressure differential means may include a high pressure source on the outside of the drum that pushes the filtrate from a liquid sample medium through the filter cake and through the openings into the inner chamber of the drum. The source of differential pressure is preferably used in forming the filter cake of the outer surface of the drum. The filter medium composition can be, for example, a slurry of diatomaceous earth, perlite, cellulose, activated carbon, mixtures of different grades or filter media, or mixtures thereof. The filter medium composition can be applied and pushed or pulled toward the outer surface of the drum, and held on the outer surface, by the pressure differential source to form the filter cake.

A container such as a trough is provided for containing a sample medium to be separated by the filter. The container preferably has a width that is substantially the same width, or greater, as the outer diameter of the drum, including the thickness of a filter cake on the outer surface of the drum. The length of the container is preferably at least as long as the length of the drum. The container is preferably positioned with respect to the drum such that when filled with a sample medium to a normal fill level, from about 1% to about 25% of the filter cake on the outer surface of the drum rests within the sample medium, more preferably, from about 5% to about 20% of the total external surface area of the filter cake contacts a sample medium in the container when the container is filled to a normal operating fill level. The container is preferably positioned such that as the drum rotates, a portion of the outer surface of the drum rotates through and then out of the sample medium.

After a portion of the drum rotates through the sample medium and out of the sample medium, the filter cake, or layer of filter medium, that has contacted the sample medium holds components from the sample medium that cannot pass through the filter cake. The holding force to maintain the portion of the sample medium that did not pass through the filter cake is typically the source of differential pressure. The source, such as a vacuum source, draws or forces filtrate from the sample medium through the filter cake to the inner chamber. Once the filtrate enters the inner chamber, it can be collected in the inner chamber by various means, for example, with a device such as the filtrate pickup device described in U.S. Pat. No. 4,442,001 to Davis, which is incorporated herein in its entirety by reference. Although the portion of the sample medium that does not pass through the filter cake may include various components, it will be referred to herein as "cell waste." Cell waste may be exemplified by actual cell waste from a sample medium that includes an enzyme fermentation broth.

To further promote the recovery of filtrate from the sample medium, the cell waste stuck to the outer surface of the filter cake can be treated with water sprays, salt sprays, pH adjusting agent sprays, or other agents or components that promote a more complete recovery filtrate from the cell waste. Preferably, the filter cake is treated as such at a portion that has rotated out of the sample medium. The outer surface of the filter cake can also be treated with mechanical means such as a chopper that breaks up the cell waste and improves surface area of the cell waste. Chopping may improve recovery of filtrate from the sample medium. If a chopper is used to mechanically agitate the cell waste on the filter cake, is preferable to provide a water spray to the cell waste on the filter cake after the filter cake has been chopped.

In operation, a scraping device such as a knife or blade is positioned adjacent the filter cake such that as the drum rotates around after passing through the sample medium, a thin layer of the filter cake is removed along with the cell waste adhered or otherwise stuck to the surface of the filter cake. Preferably, the scraping device is positioned to contact the filter cake at from about 180° to about 270° around the axis of rotation after the filter cake rotates out of the sample medium. The scraping device has a top surface that preferably declines with respect to a contact edge of the scraping device. Thus, the contact edge contacts the filter cake such that the removed filter cake and cell waste travels down the surface of the sloped scraping device and into a waste container or conveying device.

The scraping device may continuously advance toward the outer surface of the drum during operation such that a thinner and thinner coating of filter cake is left on the drum after each rotation thereof. Under such circumstance, the applicator could be controlled to provide a thicker regenerated coating to the outer surface upon each rotation of the drum or the drum can operate with continuously thinner filter cake coatings until a nominal filter cake thickness is achieved and the construction of a brand new filter cake layer is desired.

Positioned after the scraping device, but before the drum re-enters the container of sample medium, an applicator is provided for refreshing the layer of filter cake on the outer surface of the drum. Preferably, the applicator is located immediately after and below the scraping device and in the vicinity of the outer portion of the drum just above the container. By "immediately" after what is meant is from about 1° to about 45° around the axis of rotation, more preferably, from about 20° to about 35° around the axis of rotation relative to the position of the scraping device. With such an arrangement, a refreshed layer of filter cake is formed on a portion of the drum just before the portion enters the sample medium.

According to an embodiment of the present invention, a retrofit kit is provided and includes an applicator and a positioning structure that can be mounted, fixed, or otherwise positioned with respect to an existing rotary drum vacuum filter for supplying a continuously regenerated filter cake to the existing drum after a scraping action. Preferably, the positioning structure functions to position the applicator relative to the scraping device such that in operation of the drum, the applicator is maintained at a constant distance from the outer surface of a layer of filter medium or filter cake disposed on the outer surface of the drum. Preferably, the positioning structure positions the applicator at from about 1° to about 45° around the axis of rotation, more preferably, at from about 20° to about 35° around, for example, about 25° around, the axis of rotation relative to the position of the spraying device.

The applicator, whether part of a rotating drum pressure differential filter or part of a retrofit kit, preferably comprises at least one spray nozzle device and more preferably comprises a plurality of spray nozzle devices arranged, positioned, or arranged to be positioned spaced from each other and along the length of the drum. The applicator could instead include a doctor blade or similar applicator device. The spray nozzles may include a pressurized gas conduit, a pressurized filter medium conduit, and a nozzle that combines pressurized gas from the pressurized gas conduit with pressurized filter medium from the pressurized filter medium conduit. The nozzle forms a spray of the pressurized filter medium and gas that is directed toward the outer surface of the drum.

Preferably, the applicator is a spray nozzle connected to a continuously re-circulating filter medium supply system that includes a recirculating loop of filter medium. According to an embodiment of the present invention, the pressurized filter medium conduit is disposed within the pressurized gas conduit, and the nozzle preferably includes an orifice plate having a backside that in operation contacts the filter medium flowing through the pressurized filter medium conduit. The orifice plate preferably has a front side opposite the backside and an opening through the orifice plate to allow the passage of filter medium from the pressurized filter medium conduit through the nozzle. In operation, filter medium flowing through the pressurized filter medium conduit preferably flows in a direction that is substantially tangential to the backside of the orifice plate. With such an arrangement, clogging of the nozzle, as occurs with large particles of filter medium, is eliminated or at least minimized due to the sweeping and clearing action of the tangential flow of filter medium against the backside of the orifice plate. The system results in a spray nozzle design that is greatly improved relative to designs wherein a flow passage forces a flow of filter medium directly toward the backside of an orifice plate.

According to a two-stage apparatus and method of the present invention, the filter cake and cell waste scraped from the rotating drum pressure differential filter is used in a subsequent filtration process. According to such embodiments, the scraped cell waste and filter cake may preferably be resuspended by the addition of water or other sample medium forming components and subsequently conveyed or otherwise transferred to he used by or filtered through another rotating drum pressure differential filter. Preferably, the scraped cell waste is directly transferred to the second filter without a heat treatment step between the filters. Treatments such as flocculation or resuspension may be included between the filters. For example, the cell waste and filter cake from a first rotating drum pressure differential filter is reconstituted with water to form a liquid sample medium which is then filtered by a second rotating drum pressure differential filter. In cases where the original sample medium comprises an enzyme, enzyme that was not recovered by the first filter but that was instead scraped from the surface thereof can be recovered through a second filtration process using a second rotating drum pressure differential filter. Preferably, the second filter is also a filter according to the present invention. With such an arrangement, it is not necessary to recover a great percentage of enzyme with the first filter because non-recovered enzyme can be isolated or separated by a second filtration step. Thus, the speed of rotation for the first filter can be increased as the need for filtering efficiency can be decreased knowing a second filtration will take place. For example, the first filtration process only needs to achieve a filtration efficiency of, for instance, 70%, more preferably 80%, or even more preferably 90%, because non-recovered enzymes would be subjected to a second filtration process. An apparatus to carry out such a two-stage process preferably includes a conveying device to convey scraped filter cake and cell waste from the first filter to a sample medium container for use in conjunction with the second filter. In a preferred embodiment, the second filter has the same components, or similar components to those used in the first rotating drum pressure differential filter.

The present invention also provides a method of increasing the yield of a filtrate component wherein a separation method using two or more rotating drum pressure differential filters in accordance with the present invention results in a yield of filtrate component that exceeds the yield that would be obtained if only a single such filter were used. According to such a method, the combined yield of filtrate component separated from the sample medium by the first rotating drum pressure differential filter; and the filtrate component separated from scraped sample medium, scraped filter medium, or both, by the second rotating drum pressure differential filter is greater than the yield of filtrate component separated from the sample medium by the first rotating drum pressure differential filter alone. Preferably, both the throughput rate of processed sample medium and the yield of filtrate component recovered (e.g., enzyme) are increased according to the present invention relative to the throughput rate that would be necessary to achieve the same yield of filtrate component with a single rotating drum pressure differential filter alone, and relative to the yield of filtrate component recovered by the use of a single rotating drum pressure differential filter alone.

The present invention also relates to filtration systems comprising multiple rotating drum pressure differential filters in accordance with the present invention. According to the systems of the present invention, multiple filters can be provided with filtration medium from a common source, preferably, from a re-circulating filtration medium supply system. Each filter of the multiple filter system is also preferably supplied with a continuous supply of sample medium such as a fermentation broth and the sample medium for all of the filters can be supplied from a common source. The multiple filters in a multiple filter system according to the present invention can each operate independently of the others or, as described above, can be arranged such that cell waste scrapped from one of the filters can be used, preferably after resuspension, as a sample medium for a subsequent filter.

The invention will now be described with reference to the drawing figures which are intended to illustrate, not limit, the present invention.

Figure 1:
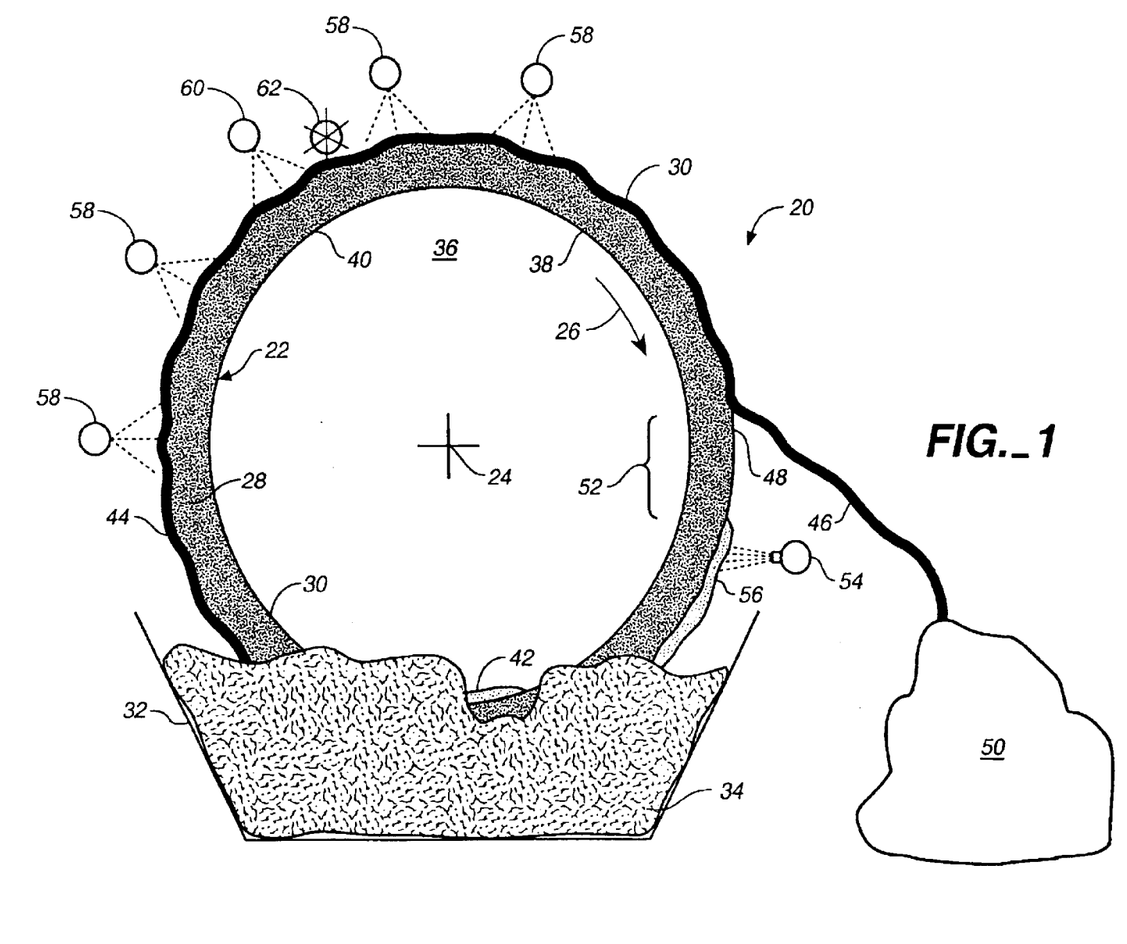
FIG. 1 is a schematic end view of a rotating drum pressure differential filter according to an embodiment of the present invention, shown in partial cross-section through an end of the drum and the sample medium container.

FIG. 1 is a schematic end view of a rotating drum pressure differential filter 20 according to an embodiment of the present invention. The filter includes a hollow cylindrical drum 22 that is rotatable at about an axis of rotation 24. In operation, the drum shown in FIG. 1 rotates in a clockwise direction as shown by directional arrow 26. On an outer surface 28 of a drum sidewall 40 a filter cake 30 is provided, for example, a filter cake made of a diatomaceous earth slurry. The drum sidewall 40 includes the outer surface 28 of the drum and an inner surface 38 of the drum. As the drum 22 rotates, it passes through a container 32 that contains a sample medium 34 having components to be filtered. A pressure source (not shown) causes a vacuum in an inner chamber 36 inside the drum 22 that is at least partially defined by a inner wall surface 38 of the sidewall 40. The sidewall 40 has a plurality of openings therethrough and is preferably in the form of a perforated, metallic material such as aluminum or stainless steel, preferably perforated or provided with thousands of small openings, each preferably having an average diameter that is smaller than the average diameter of the filter medium material particles. The sidewall may preferably include a cloth or cloth material, for example, a polypropylene woven fabric.

As the drum 22 rotates through the sample medium 34, filtrate 42 is recovered from the sample medium 34 through the filter cake 30 and through the openings (non shown) in the sidewall 40. Components 44 that do not pass through the filter cake 30 and sidewall 40 remain on an outer surface of the filter cake 30 and are carried around the outside of drum 22. A scraping device 46 is provided and is positioned such that a scraping edge 48 of the scraping device 46 rests against the outer surface of the filter cake and scrapes components 44 and a thin layer of filter cake off of the outer surface of the filter cake 30 as the drum 22 rotates. The scraped components 44 and thin layer of filter cake pass along a top surface of scraping device 46, for example, by the force of gravity, and are collected as scraped product or cell waste 50.

After the scraper 46 scrapes the components 44 and the thin layer of filter cake from the outer surface of the drum 22, the filter cake 30 in the region 52 has a reduced thickness relative to the remainder of filter cake 30. An applicator 54, in the form of a spray nozzle, is positioned after the scraping device 46 relative to the direction of rotation 26 and rebuilds or refreshes the filter cake 30 by applying additional filter medium or filter cake material 56 to the outer surface of the scraped filter cake. The rebuilt or refreshed layer of filter cake then passes through sample medium 34 to begin a new filtering cycle.

Figure 2:
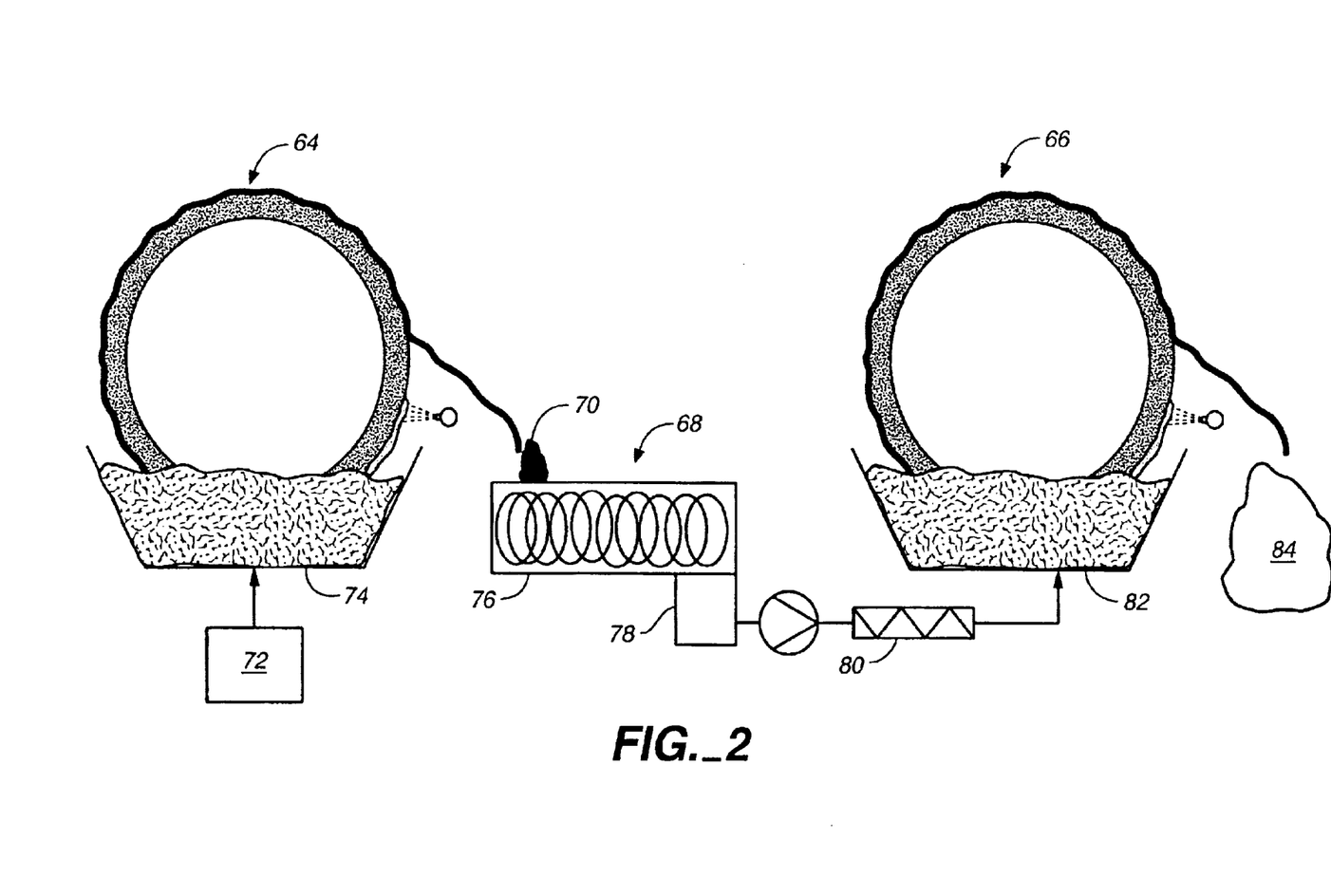
FIG. 2 is a schematic diagram of a system according to an embodiment of the present invention that comprises a first stage rotating drum pressure differential filter according to an embodiment of the present invention shown in partial cross-section, a second stage rotating drum pressure differential filter according to the present invention and a conveying device for conveying scraped material from the first filter to the second filter.

To assist in the recovery of filtrate from the sample medium components 44 remaining on the outside surface of filter cake 30, water from water sprayers 58 can be directed at components 44. A chemical treatment sprayer 60 can also be provided to spray, for example, a salt, a salt solution, a pH adjusting agent, a flock adjusting agent, or other recovery agents at components 44 on the outer surface of the drum 22. Mechanical agitating means such as a chopper 62 can also be provided to increase the surface area of the layer of components 44 for assisting in the further recovery of filtrate from components 44 and for preparing the components 44 and the thin outer layer of filter medium to be scraped by scraping device 46. FIG. 2 is a schematic diagram of a system according to an embodiment of the present invention that includes a first stage rotating drum pressure differential filter 64, a second stage rotating drum pressure differential filter 66, and a conveying device 68 for conveying scraped material 70 from the first filter 64 to the second filter 66. In the system embodiment shown in FIG. 2, a fresh feed of sample medium 72, for example, an enzyme fermentation broth, is fed to a container 74 for the first filter 64. Each of filters 64 and 66 can comprise scraping devices, spray applicators, and the various other filter components described in connection with the filter embodiment shown in FIG. 1. Scraped materials 70 from the first drum 64 are supplied to a screw conveyer 76 and are preferably resuspended with water at a suspension station 78. The resuspended mixture of scraped sample components and filter medium is then preferably mixed with a static mixture 80 before being fed as a sample medium to a container 82 for the second filter 66. Scraped material 84 from the second filter 66 can be reprocessed in a similar fashion through one or more additional filters (non shown) or can be treated as a final waste material. Filtrate recovered from filters 64 and 66 can be combined and the system can produce a high yield of filtrate from the original feed 72 in a cost-effective and quick process.

Figure 3:
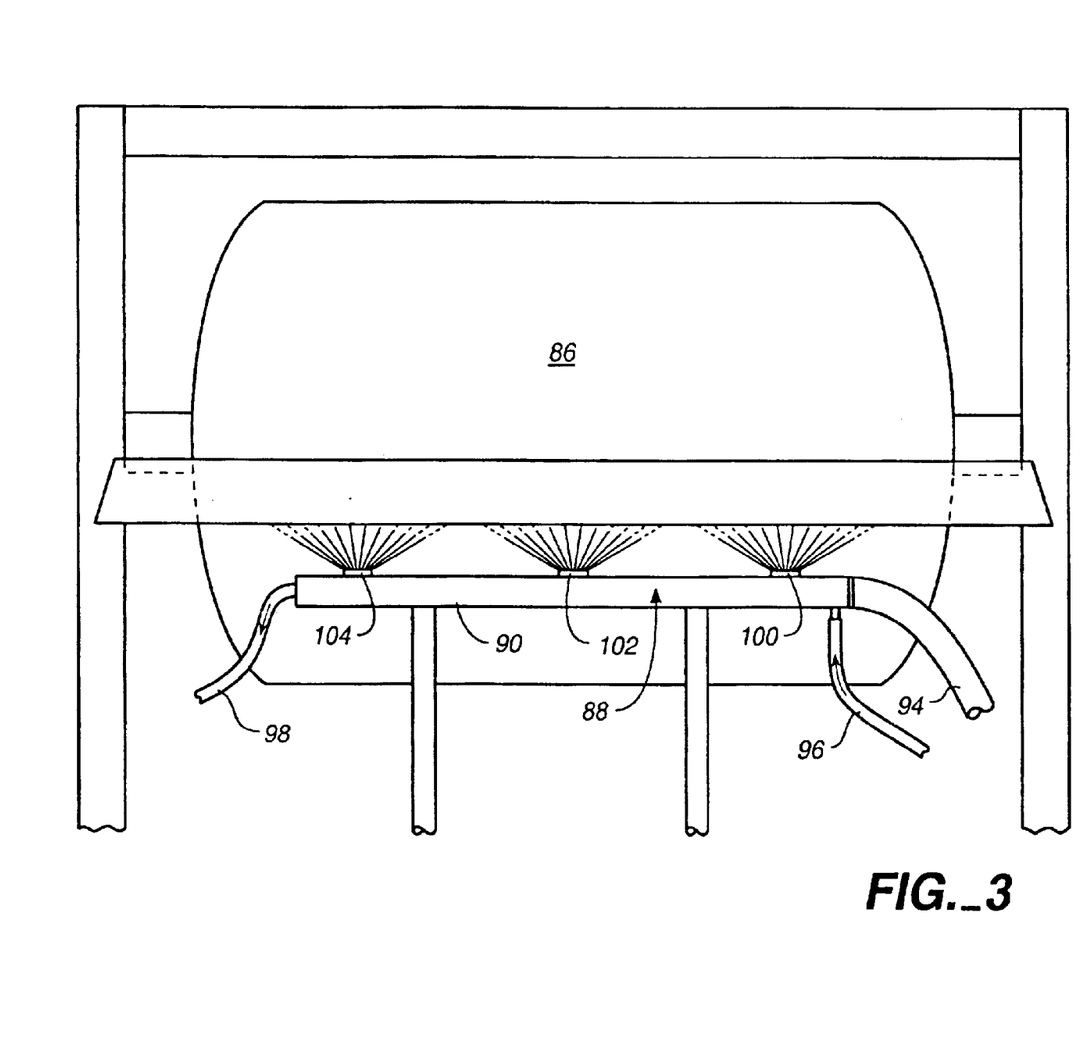
FIG. 3 is a side view of a rotating drum pressure differential filter including a spray applicator in accordance with the present invention, with the sample medium container removed for the sake of simplicity.
Figure 4:
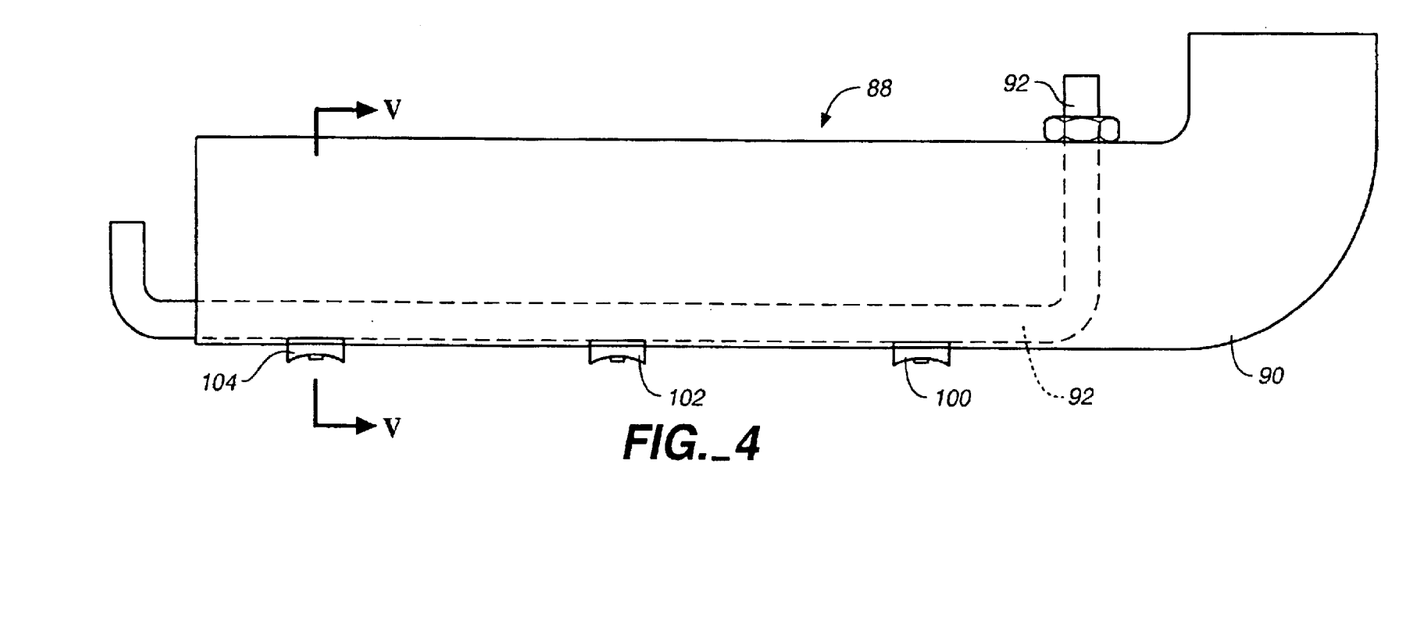
FIG. 4 is a schematic diagram of a spray applicator device according to an embodiment of the present invention showing the pressurized filter medium conduit in partial phantom view within the pressurized fluid conduit.
Figure 5:
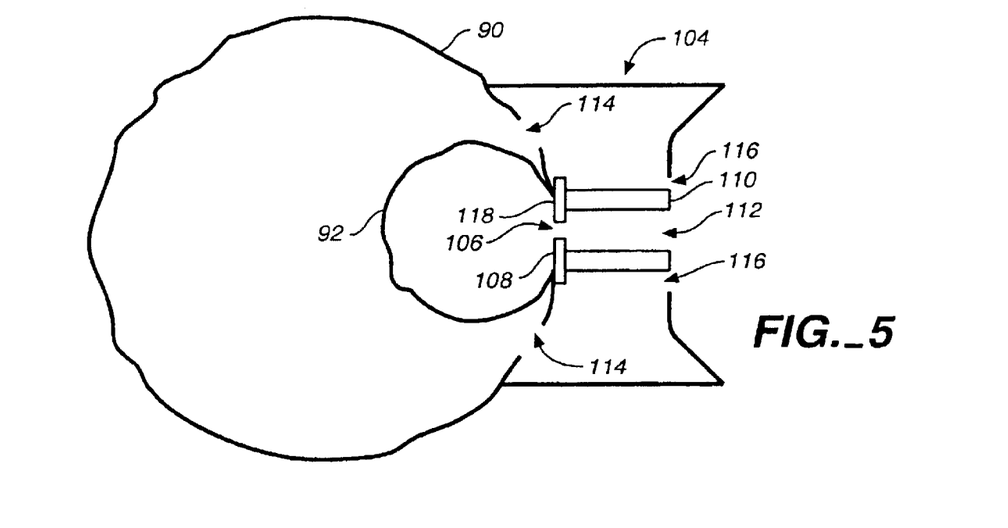
FIG. 5 is an end view of a spray applicator device taken along line V—V of FIG. 4.
Figure 6:
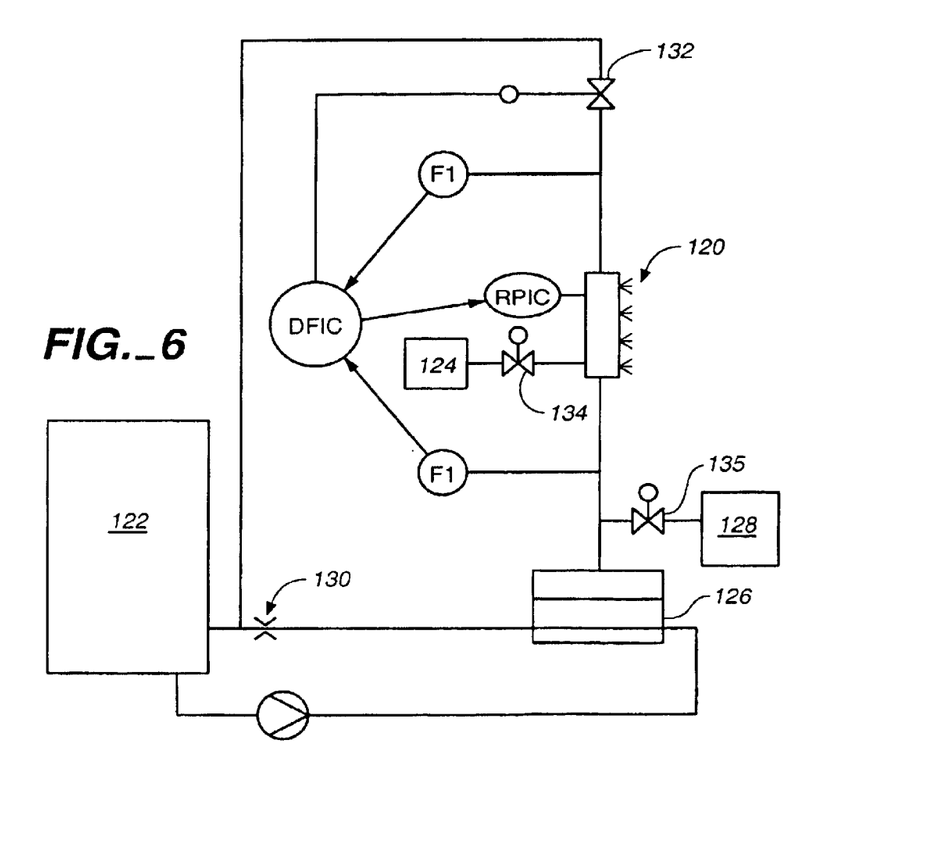
FIG. 6 is a process flow diagram showing a re-circulating pressurized filter medium application system according to an embodiment of the present invention.

FIG. 3 is a side view of a rotating drum pressure differential filter 86 according to an embodiment of the present invention. The filter includes a spray applicator 88 having a design that can be useful as the spray applicator 54 shown in FIG. 1. A more detailed view of the spray applicator 88 is shown in FIGS. 4 and 5. As shown in FIG. 3, the spray applicator 88 includes a pressurized gas conduit 90, a pressurized filter medium conduit 92, a pressurized gas conduit supply line 94, a pressurized filter medium conduit supply line 96, a pressurized filter medium re-circulating line 98, and a plurality of nozzles 100, 102 and 104. As can be seen in FIGS. 4 and 5, in the embodiment shown, the pressurized filter medium conduit 92 is positioned inside of the pressurized gas conduit 90. The cross-sectional end view in FIG. 5, taken along line V—V of FIG. 4, shows the detail of nozzle 104.

As shown in FIG. 5, the pressurized filter medium conduit 92 is positioned inside of pressurized gas conduit 90 and has an opening 106 that is at least partially defined by an orifice plate 108. Extending from the orifice plate 108 is a filter medium outlet 110 having an opening 112 that preferably has a larger diameter than the diameter of opening 106 defined by the orifice plate 108. A portion of the pressurized filter medium passing through conduit 92 exits the conduit through opening 106 in orifice plate 108 and passes through filter medium outlet 110 and out opening 112. Simultaneously, pressurized gas from within conduit 90 passes through passages 114 and out nozzle 104 thorough gas passages 116. The simultaneous expulsion of filter medium through opening 112 and pressurized gas through gas passages 116 forms a spray of a filter medium slurry. The design optimizes the consumption of filter medium, prevents blocking of the nozzle by filter medium particles, provides a high cross flow outside the orifice plate, and provides a facilitated atomizing air pressure requirement. Filter medium that does not exit the nozzles passes out of pressurized filter medium conduit 92 and is recirculated through filtered medium re-circulating line 98. The flow of pressurized filter medium through conduit 92 is tangential to the backside 118 of orifice plate 108.

FIG. 6 is a process flow diagram showing a re-circulating pressurized filter medium application system that can be used with the spray applicator devices according to embodiments of the present invention. As shown in FIG. 6, a plurality of spray nozzles 120 are supplied with a pressurized filter medium slurry 122 such as a slurry of diatomaceous earth and water. The supply of pressurized air 124 is supplied to be mixed with the filter medium in a manner as embodied in FIGS. 3–5. Prior to reaching the spray nozzles 120, the filter medium 122 is strained by a strainer 126. Flow indicators FI are provided to measure the flow of pressurized filter medium before and after the flow passes through the plurality of nozzles 120. Signals from the flow indicators are fed to a differential flow indication control unit DFIC that determines whether adjustments need to be made in the flow of filter medium and/or the flow of air through the system. Measurements are taken by a ratio pressure indicator control (RPIC) that produces a signal indicative of the ratio of the flow volume being sprayed to the air pressure. A signal from the DFIC is fed to the RPIC to control the ratio of the flow volume being sprayed to the air pressure. A choke 130 can be provided to maintain the system pressure. Control valves 132 and 134 can be used to control the spray rate based on signals sent by the differential flow indication controller DFIC. The control valves 132 and 134 together with the various controllers, can be used to provide a correct ratio of filter medium to air and thus provide a desired filter medium composition to be applied though the nozzles 120. On/off valve 135 can be used to supply a flushing water through the system to flush out filter medium upon a shut-down operation at the conclusion of a filtering run.

Figure 7:
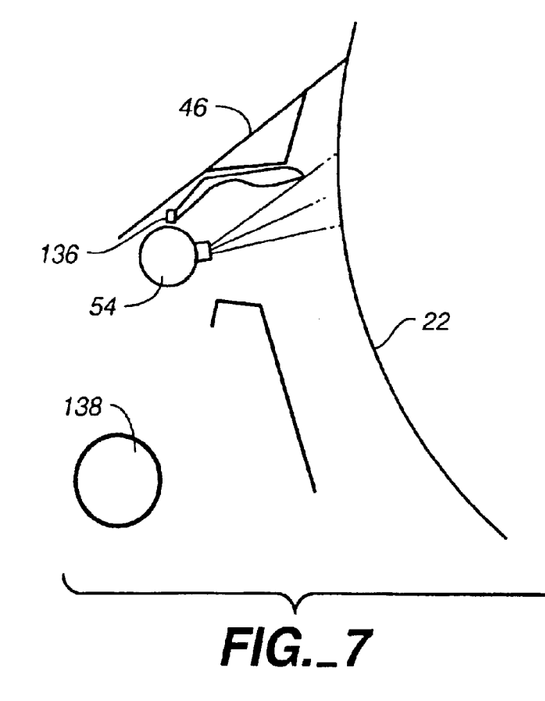
FIGS. 7–8 depict different spray apparatus arrangements to prevent dripping of wet filter medium composition into a cell waste container.
Figure 8:
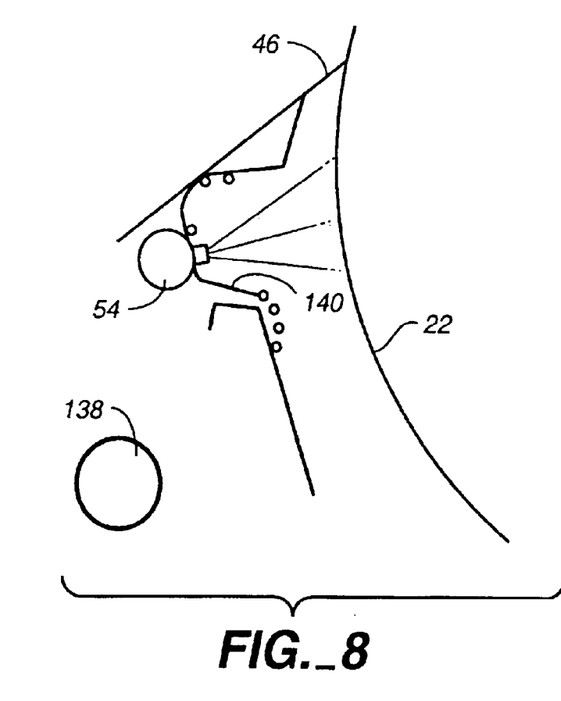

FIGS. 7 and 8 show different spray apparatus arrangements according to the present invention to prevent contamination caused by dripping liquid components that gather on the underside of scraping blade 46 and can contaminate collected scraped material or the filter medium spray. In the embodiment of FIG. 7, an air supply or air sprayer 136 is provided to blow air at the underside of the scraper 46 to form a protective airbed between the bottom of the scraper 46 and the spray applicator 54. The protective airbed prevents the spray emitted from applicator 54 from hitting the bottom of the scraper 46 and prevents material dripping from the underside of scraper 46 from interfering with the spray emitted from spray applicator 54. In addition, water or other liquid components dripping down the underside of scraper 46 do not contaminate scraped material that has collected at a collection site 138, for example, a screw conveyor. The air sprayer 136 can be integrated into the design of the spray applicator 54 or can be separately provided and positioned.

FIG. 8 shows another spray contamination prevention system. In the embodiment shown in FIG. 8, a sheet metal guide 140 is positioned against the bottom of the scraper 46 and directs droplets of liquid from the bottom of scraper 46 to a collection vat. The sheet metal 140 is preferably provided with holes therein through which the spray applicators 54 can extend so that the sheet metal 140 does not interfere with a spray of filter medium emitted from spray applicators 54.

Figure 9:
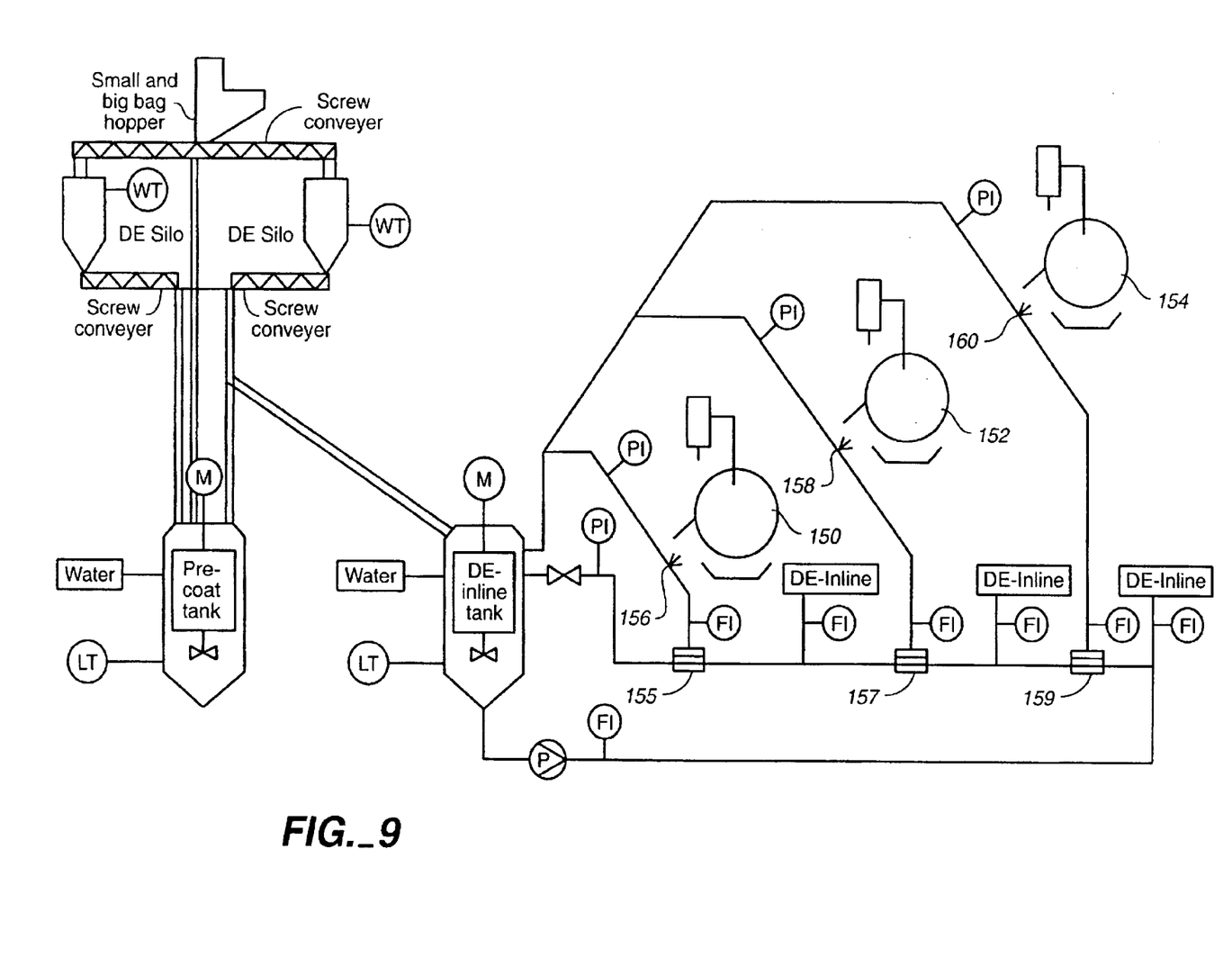
FIG. 9 is a schematic diagram of a continuous coating process employing three rotary drum pressure differential filters, in accordance with an embodiment of the present invention.
Figure 10:
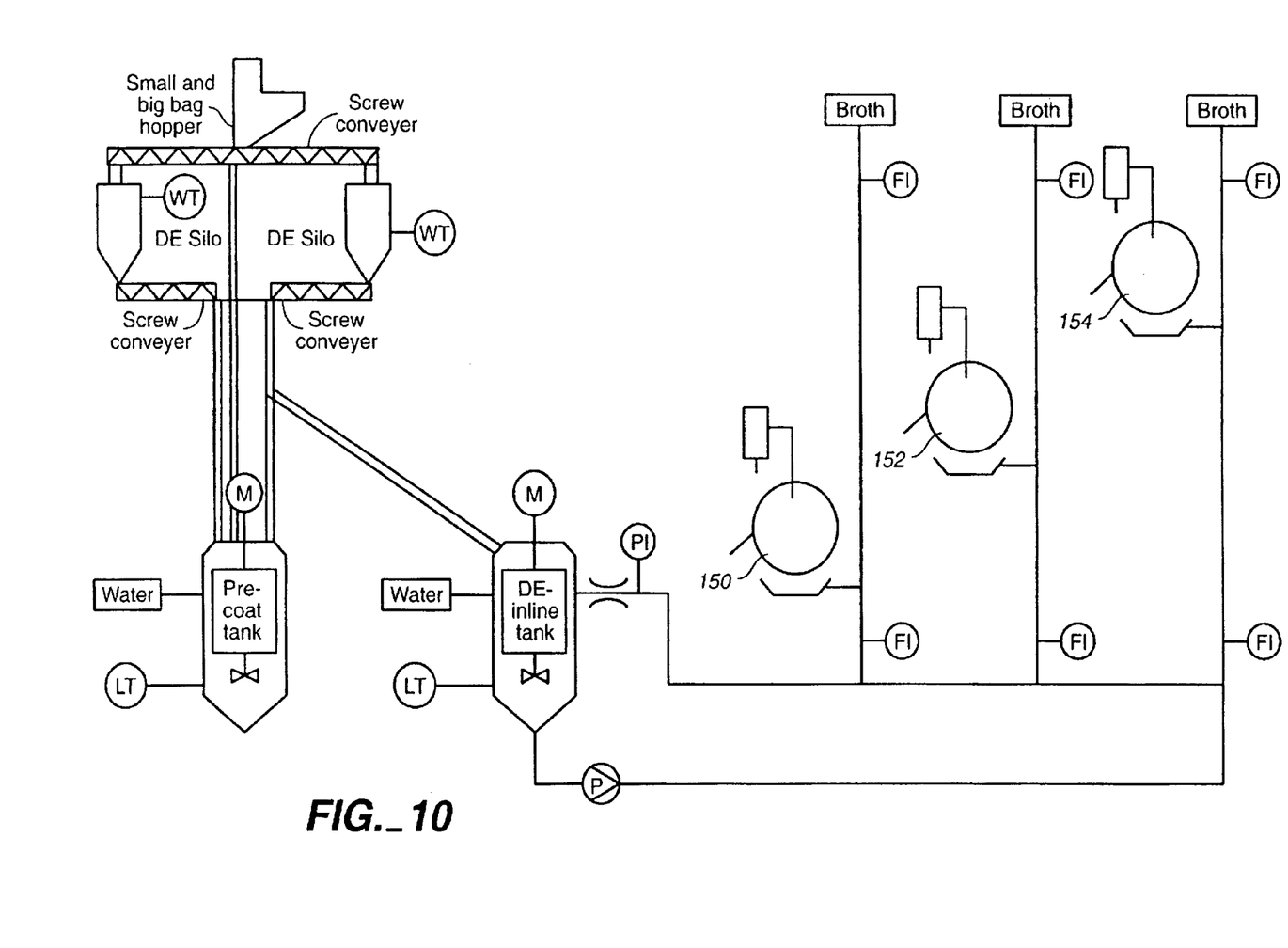
FIG. 10 is a schematic diagram of an in-line system employing three rotary drum pressure differential filters, in accordance with another embodiment of the present invention.

FIGS. 9 and 10 are schematic diagrams of a continuous coating system employing three rotary drum pressure differential filters, in accordance with an embodiment of the present invention. As shown in FIGS. 9 and 10, three rotating drum pressure differential filters, 150, 152, and 154, are provided with diatomaceous earth (DE) filter medium supplied from a common source. Flow indicators FI and pressure indicators PI are used to provide signals so that adjustments can be made so as to provide each of the filters with a substantially similar supply of filter medium through their respective spray applicator apparatus, 156, 158, 160, respectively. Flow controllers as are know to those skilled in the art can be used to adjust the spray rate. Strainers 155, 157, and 159 are provided to clean the filter medium slurry before it is sprayed. A motor M is provided to agitate the filter medium slurry in the DE in-line tank and the amount of filter medium in the DE in-line tank is detected by a level transmitter LT. Weight Transmitters WT are provided at the filter medium silos to provide diatomaceous earth that is to be mixed with water in the DE in-line tank. The system shown in FIGS. 9 and 10 includes a pump provided for the continuous recirculation of the diatomaceous earth filter medium and the supply of the filter medium to each of the three filters. One or more supply lines shown in FIG. 10, are provided to supply the sample medium container with a sample medium to be filtered.

In FIG. 10, reference numerals identical to those used in FIG. 9 represent the same components. FIG. 10 shows the supply lines for the sample medium used in the embodiment of FIG. 9. As shown in FIG. 10, the three filters 150, 152, and 154 are provided and are supplied with sample medium broth from three separate sources and each supply is mixed with diatomaceous earth from the recirculating supply of diatomaceous earth shown in FIGS. 9 and 10. Alternatively, the sample medium broth filtered by each of the three filters can be supplied by a common source.

Other embodiments and advantages of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rotating drum pressure differential filter comprising:

a drum rotatable about an axis of rotation, said drum including at least one wall having an inner surface that at least partially defines an inner chamber, and an outer surface, said wall including at least one opening for allowing the passage of fluid from outside the drum to said inner chamber;

drive to rotate said drum about said axis of rotation;

a source of differential pressure to provide a lower pressure in said inner chamber than outside said drum;

a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

a scraper adapted to be positioned adjacent said drum for scraping a layer of filter medium from said drum; and an applicator adapted to be positioned adjacent said drum between said scraper and said container for directing a layer of filter medium toward said outer surface, wherein said applicator comprises at least one nozzle, a pressurized gas conduit, a pressurized filter medium conduit, and a nozzle that combines pressurized gas from said pressurized gas conduit with pressurized filter medium from said pressurized filter medium conduit, to form a spray;

wherein said pressurized filter medium conduit is disposed within said pressurized gas conduit; and wherein said nozzle includes an orifice plate having a backside which in operation contacts filter medium flowing through said pressurized filter medium conduit, a front side opposite said backside, and an opening through said orifice plate to allow for the passage of filter medium from said pressurized filter medium conduit through said nozzle.

2. The filter of claim 1, wherein in operation filter medium flows through said pressurized filter medium conduit in a direction substantially tangential to the backside of said orifice plate.

3. A rotating drum pressure differential filter comprising:

a drum rotatable about an axis of rotation, said drum including at least one wall having an inner surface that at least partially defines an inner chamber, and an outer surface, said wall including at least one opening for allowing the passage of fluid from outside the drum to said inner chamber;

a drive to rotate said drum about said axis of rotation;

a source of differential pressure to provide a lower pressure in said inner chamber than outside said drum;

a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

a scraper adapted to be positioned adjacent said drum for scraping a layer of filter medium from said drum; and an applicator adapted to be positioned adjacent said drum between said scraper and said container for directing a layer of filter medium toward said outer surface;

wherein said applicator comprises at least one nozzle, a pressurized gas conduit for carrying a pressurized gas, and a pressurized filter medium conduit for carrying a pressurized filter medium slurry;

wherein the at least one nozzle is capable of combining pressurized gas from said pressurized gas conduit with pressurized filter medium slurry from said pressurize filter medium conduit, to form a spray.

4. A rotating drum pressure differential filter comprising:

a drum rotatable about an axis of rotation, said drum including at least one wall having an inner surface that at least partially defines an inner chamber, and an outer surface, said wall including at least one opening for allowing the page of fluid from outside the drum to said inner chamber;

a drive to rotate said drum about said axis of rotation;

a source of differential pressure to provide a lower pressure in said inner chamber than outside said drum;

a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

a scraper adapted to be positioned adjacent said drum for scraping a layer of filter medium from said drum;

an applicator adapted to be positioned adjacent said drum between said scraper and said container for directing a layer of filter medium toward said outer surface; and means to simultaneously operate said scraper and said applicator such that, in operation, said applicator directs a layer of filter medium toward said outer surface at the same time that said scraper scrapes a layer of filter medium from said drum.

5. The filter of claim 4, further comprising a filter medium applied to the outer surface of said drum as a layer which can be scraped off of said outer surface, said filter medium being capable of covering said at least one opening and separating components that can pass through said layer and through said at least one opening from components that cannot pass through said layer.

6. The filter of claim 4, wherein said applicator and said scraper are fixed with respect to each other by a mounting means that maintains said applicator at a constant distance away from an outer surface of a layer of filter medium scraped by said scraper.

7. A rotating drum pressure differential filter system comprising:

at least a first and a second rotating drum pressure differential filter, each of said first and second filters comprising;

a drum rotatable about an axis of rotation, said drum including at least one wall having an inner surface that at least partially defines an inner chamber, and an outer surface, said wall including at least one opening for allowing the passage of fluid from outside the drum to said inner chamber;

a drive to rotate said drum about said axis of rotation;

a source of differential pressure to provide a lower pressure in said inner chamber than outside said drum; and a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

at least one of said first and second rotating drum pressure differential filters having a scraper to remove sample medium, filter medium, or both, from the respective outer surface; and a conveyor to convey scraped sample medium, scraped filter medium, or both, from one of said first and second rotating drum pressure differential filters for use in the other of said first and second rotating drum pressure differential filters;

wherein at least one of said containers of said first and second filters contains a sample medium and said sample medium comprises at least one enzyme and at least one other component to be separated from said at least one enzyme, and at least one of the rotating drum pressure differential filters further comprises:

an applicator adapted to be positioned adjacent said drum between said scraper and said container for directing a layer of filter medium toward said outer surface;

wherein said applicator comprises at least one nozzle, a pressurized gas conduit for carrying a pressurized gas, and a pressurized filter medium conduit for carrying a pressurized filter medium slurry, and the at least one nozzle is capable of combining pressurized gas from said pressurized gas conduit with pressurized filter medium slurry from said pressurized filter medium conduit, to form a spray.

8. The rotating drum pressure differential filter system of claim 7, wherein a pressurized filter medium slurry is disposed within the pressurized filter medium conduit.

9. The rotating drum pressure differential filter system of claim 7, wherein each of the first and second rotating drum pressure differential filters includes at least one nozzle connected to the pressurized filter medium conduit.

10. A rotating drum pressure differential filter system comprising:

at least a first and a second rotating drum pressure differential filter, each of said first and second filters comprising;

a drum rotatable about an axis of rotation said drum including at least one wall having an inner surface that at least partially defines an inner chamber, and an outer surface, said wall including at least one opening for allowing the passage of fluid from outside the drum to said inner chamber;

a drive to rotate said drum about said axis of rotation;

a source of differential pressure to provide a lower pressure in said inner chamber than outside said drum; and a container for containing a sample medium having components to be separated, said container being positioned with respect to said drum such that, in operation said drum is rotated about said axis of rotation and at least a portion of a layer of filter medium applied to the outside surface of said drum rotates within the container to contact a sample medium disposed within the container;

at least one of said first and second rotating drum pressure differential filters having a scraper to remove sample medium, filter medium, or both, from the respective outer surface; and a conveyor to convey scraped sample medium, scraped filter medium, or both, from one of said first and second rotating drum pressure differential filters for use in the other of said first and second rotating drum pressure differential filters;

wherein at least one of said containers of said first and second filters contains a sample medium and said sample medium comprises a fermentation broth, and at least one of the rotating drum pressure differential filters further comprises:

an applicator adapted to be positioned adjacent said drum between said scraper and said container for directing a layer of filter medium toward said outer surface;

wherein said applicator comprises at least one nozzle, a pressurized gas conduit for carrying a pressurized gas, and a pressurized filter medium conduit for carrying a pressurized filter medium slurry, and the at least one nozzle is capable of combining pressurized gas from said pressurized gas conduit with pressurized filter medium slurry from said pressurized filter medium conduit, to form a spray.

11. The rotating drum pressure differential filter system of claim 10, wherein a pressurized filter medium slurry is disposed within the pressurized filter medium conduit.

12. The rotating drum pressure differential filter system of claim 10, wherein each of the first and second rotating drum pressure differential filters includes at least one nozzle connected to the pressurized filter medium conduit.

13. A rotating drum pressure differential filter system comprising:

at least a first and a second rotating drum pressure differential filter, each of said first and second filters comprising;

a drum rotatable about an axis of rotation, said drum including at least one wall having an inner surface that at least partially defines an inner chamber, and an outer surface, said wall including at least one opening for allowing the passage of fluid from outside the drum to said inner chamber;

a drive to rotate said drum about said axis of rotation;

a source of differential pressure to provide a lower pressure in said inner chamber than outside said drum; and a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

at least one of said first and second rotating drum pressure differential filters having a scraper to remove sample medium, filter medium, or both, from the respective outer surface; and a conveyor to convey scraped sample medium, scraped filter medium, or both, from one of said first and second rotating drum pressure differential filters for use in the other of said first and second rotating drum pressure differential filters;

wherein at least one of said first and second filters further comprises a filter medium, applied as a layer to the outer surface of the respective drum of the filter, and which can be scraped off of the outer surface of said respective drum, said filter medium being capable of covering said at least one opening and separating components that can pass through said layer and through the respective at least one opening from components that cannot pass through said layer; and wherein said filter medium comprises diatomaceous earth, and at least one of the rotating drum pressure differential filters further comprises:

an applicator adapted to be positioned adjacent said drum between said scraper and said container for directing a layer of filter medium toward said outer surface;

wherein said applicator comprises at least one nozzle, a pressurized gas conduit for carrying a pressurized gas, and a pressurized filter medium conduit for carrying a pressurized filter medium slurry, and the at least one nozzle is capable of combining pressurized gas from said pressurized gas conduit with pressurized filter medium slurry from said pressurized filter medium conduit, to form a spray.

14. The rotating drum pressure differential filter system of claim 13, wherein a pressurized filter medium slurry is disposed within the pressurized filter medium conduit.

15. The rotating drum pressure differential filter system of claim 13, wherein each of the first and second rotating drum pressure differential filters includes at least one nozzle connected to the pressurized filter medium conduit.

16. A rotating drum pressure differential filter comprising:

a drum rotatable about an axis of rotation, said drum including at least one wall having an inner surface that at least partially defines an inner chamber, and an outer surface, said wall including at least one opening for allowing the passage of fluid from outside the drum to said inner chamber;

a drive to rotate said drum about said axis of rotation;

a source of differential pressure to provide a lower pressure in said inner chamber than outside said drum;

a container for containing a sample medium having components to be separated, said container being positioned with respect to said drum such that, in operation, said drum is rotated about said axis of rotation and at least a portion of a layer of filter medium applied to the outside surface of said drum rotates within the container to contact a sample medium disposed within the container;

a scraper adapted to be positioned adjacent said drum for scraping a layer of filter medium from said drum; and an applicator adapted to be positioned adjacent said drum between said scraper and said container for directing a layer of filter medium toward said outer surface, said applicator comprising at least one nozzle, a pressurized gas conduit, a pressurized filter medium conduit, a pressurized filter medium slurry disposed within the pressurized filter medium conduit, and a pressurized gas disposed within the pressurized gas conduit;

wherein the nozzle is capable of combining the pressurized gas from said pressurized gas conduit with the pressurized filter medium slurry from said pressurized filter medium conduit, to form a spray comprising a filter medium slurry.

17. The rotating drum pressure differential filter of claim 16, wherein the filter slurry comprises diatomaceous earth.

* * * * *